US009137345B2

(12) United States Patent
Karimi-Cherkandi et al.

(10) Patent No.: US 9,137,345 B2
(45) Date of Patent: *Sep. 15, 2015

(54) APPARATUS AND METHOD FOR AUDIO DATA PROCESSING

(75) Inventors: Bizhan Karimi-Cherkandi, Boca Raton, FL (US); Vijayalakshmi Ranganathan, Delray Beach, FL (US); Schah Walli Ali, Boca Raton, FL (US)

(73) Assignee: Unify GmbH & Co. KG, Munich (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/359,749

(22) PCT Filed: Sep. 13, 2012

(86) PCT No.: PCT/US2012/055137
§ 371 (c)(1),
(2), (4) Date: Jul. 9, 2014

(87) PCT Pub. No.: WO2014/042640
PCT Pub. Date: Mar. 20, 2014

(65) Prior Publication Data
US 2014/0348307 A1    Nov. 27, 2014

(51) Int. Cl.
*H04M 1/64* (2006.01)
*H04M 1/65* (2006.01)
(Continued)

(52) U.S. Cl.
CPC ............. *H04M 1/6505* (2013.01); *G10L 15/26* (2013.01); *H04M 1/656* (2013.01); *H04M 3/42221* (2013.01); *H04M 3/5183* (2013.01)

(58) Field of Classification Search
CPC ....................... H04M 2201/40; H04M 2201/41

USPC ............. 379/68, 88.01, 88.14; 704/9; 706/50
See application file for complete search history.

(56) References Cited

U.S. PATENT DOCUMENTS 6,510,414 B1 *   1/2003   Chaves .......................... 704/270
6,721,416 B1 *   4/2004   Farrell ....................... 379/265.07
(Continued)

FOREIGN PATENT DOCUMENTS

EP    1492083 A1    12/2004
EP    1545105 A1    6/2005

OTHER PUBLICATIONS

International Search Report for PCT/US2012/055137 dated Jun. 18, 2013.
(Continued)

Primary Examiner — Fan Tsang
Assistant Examiner — Van D Huynh
(74) Attorney, Agent, or Firm — Buchanan Ingersoll & Rooney PC

(57) ABSTRACT

A communication terminal, system and method utilize a communication device that activates a speech to text application so that subsequent audio that is received from a caller is converted into text. A caller may then provide audio in response to a question. A caller may send input by pressing a button on a communication device for example, to activate the speech to text application, speak an answer, and then press a button to indicate that an answer to a question is complete. The spoken answer may be converted into text and may then be stored, parsed, and then assigned to an object representing the question posed to a caller. The stored text assigned to the object representing the question may then be used to populate different forms or databases for subsequent use or for displaying to a user via a display device of that person's computer device.

21 Claims, 5 Drawing Sheets

(51) Int. Cl.
*H04M 3/42* (2006.01)
*H04M 3/51* (2006.01)
*G10L 15/26* (2006.01)
*H04M 1/656* (2006.01)

(56) References Cited

U.S. PATENT DOCUMENTS

2007/0174388 A1* 7/2007 Williams ...................... 709/204
2008/0118051 A1 5/2008 Odinak et al.
2010/0131265 A1* 5/2010 Liu et al. ........................... 704/9
2014/0244565 A1* 8/2014 de Koning ...................... 706/50

OTHER PUBLICATIONS

Written Opinion of the International Searching Authority for PCT/US2012/055137 dated Jun. 18, 2013.

* cited by examiner

APPARATUS AND METHOD FOR AUDIO DATA PROCESSING

FIELD OF INVENTION

The present invention relates to a method and a communication system that are configured to permit communication devices to exchange data such as communication networks. The invention is also related to communication devices such as servers, work stations, computers, and terminal devices such as mobile telephones, cellular phones, tablets, laptop computers, mobile internet appliances, personal digital assistants, and other mobile communication devices that may be utilized in such a system or method. More particularly, the present invention relates to a method, system, device, or product by which audio input may be translated into text data and subsequently utilized for communicating answers to questions that are originally provided in audio form.

BACKGROUND OF THE INVENTION

Call centers often receive calls from customers or prospective customers and use automated questioning that asks a caller for information specific to a particular caller. Such personal information is then often used to route the call or verify the caller is the person that the caller represents himself or herself to be. Calls may be routed to multiple different devices that subsequently ask similar or exactly the same questions as a caller may have previously been asked. Such repeated questioning often frustrates a caller attempting to discuss a particular issue with a call agent to address an issue or purchase a product or service. Such frustration may result in the caller terminating the call prior to speaking to someone or feeling that he or she experienced poor customer service.

We have determined that there is a need for a communication system that is configured to permit a caller to only have to answer questions one time for providing certain content regarding a caller. We have determined that it would be preferable for such content to be stored for use in subsequent processing of the caller's call as well as for maintaining records associated with such a call. It may also be preferable in some situations for the caller to be able to store his answers for use in subsequent calls involving other parties.

SUMMARY OF INVENTION

A communication system is provided that includes a first communication terminal and at least one of a second communication terminal and a first communication device. The at least one of the second communication terminal and the first communication device are communicatively connectable to the first communication terminal for establishing a communication session in which audio data is transmitted between the first communication terminal and at least one of the first communication device and the second communication terminal. At least one of the first communication terminal, second communication terminal and the first communication device activate a speech to text translation mechanism that translates the audio data into text data and saves the translated text data.

In some embodiments, the audio data may comprise personal information of a user of the first communication terminal or second communication terminal. The audio data may also comprise questions spoken by a user of the first or second communication terminal during the communication session. In one embodiment, the audio data may comprise audio questions and audio answers. The audio questions may be transmitted by the first communication terminal or the second communication terminal and the other terminal may transmit the audio answers to those questions. The translation of the audio data into the text data and the saving of the text data may include the steps of translating an audio question into text and saving the text of the audio question, translating the audio answer to the audio question into text and saving the text of the audio answer to that audio question so that the translated text of that audio answer is associated with the audio question to which that audio answer was given.

In other embodiments, the audio data may include audio questions transmitted by the first communication device, which may be for example a server or switch device. The audio data may also include audio answers transmitted by the first communication terminal. The translating of the audio data into text data and saving of the text data may include the step of translating an audio answer to an audio question into text and saving the text of the audio answer so that the translated text of that audio answer is associated with an object representing the audio question to which that audio answer was given. The saved text data may be used to populate a form document or may be entered into a text based document such as a word processing document or spreadsheet document by the second communication terminal or the first communication device and be saved by that terminal or device.

It should be understood that the first communication terminal and second communication terminals may each by a type of communication terminal such as a terminal associated with an employee of a business, a terminal associated with a caller, a terminal associated with an agent, a cellular phone, a table computer device, a laptop computer, a desktop computer having telephony functionality, a digital telephony device, a personal digital assistant, an internet appliance, or a computer device having telephony functionality.

In some embodiments of the system, the first communication device may provide a personal call agent service and the first communication device may activate the speech to text translation mechanism. The speech to translation mechanism may include an application stored in the memory of the first communication device that is executed by the first communication device. The first communication device may then translate the audio data into the text data and save the translated text data. The communication session may be established by the first communication terminal forming a connection with the first communication device and the first communication device receiving input identifying an address and initiating the establishing of the communication session based upon the identified address. The communication session may be established with the second communication terminal so that the first communication device and the first communication terminal and the second communication terminal are all involved in the communication session so that the first communication device receives audio data transmitted between the first and second communication terminals during the communication session. The first communication device translating of the audio data into text data and saving the translated text data may include the first communication device translating a first audio question into first text data and saving the translated first text data of the first question, the first communication device translating a first audio answer to the first audio question into second text data and saving the second text data so that the second text data is associated with the first audio question, the first communication device translating a second audio question into third text data and saving the third text data of the second audio question, and the first communication device translating a second audio answer to the second audio question into fourth text data and saving the fourth text data such that the fourth text data is associated with the second audio question. A form document may be populated by the first communication device based upon the saved first, second, third and fourth text data. In one embodiment, the first communication device may receive a third audio question from the second communication terminal and determine that it is the same as the second audio question by asking the same exact question or a question that is substantially similar in content to the second audio question. In response to such a determination, the first communication device may suggest a third answer to the third question to the first communication terminal that is in at least one of audio and text format. The third answer in audio format may comprise the second audio answer and the third answer in text format may comprise the fourth text data. The first communication device may send the third answer upon receipt of authorization to do so from the first communication device. The third answer may be sent in at least one of text format and audio format.

In other embodiments, the first communication terminal may directly provide a personal call agent service to a user of that terminal and may activate the speech to text translation mechanism. The speech to text translation mechanism may include an application stored in the first communication terminal that is executed by the first communication terminal. The first communication terminal may translate the audio data into text data and save the translated text data. The first communication terminal may form a connection with the first communication device or the second communication terminal and its translation of the audio data into text data may include the steps of the first terminal translating a first audio question into first text data and saving the translated first text data of the first question, the first communication terminal translating a first audio answer to the first audio question into second text data and saving the second text data so that the second text data is associated with the first audio question, the first communication terminal translating a second audio question into third text data and saving the third text data of the second audio question, and the first communication terminal translating a second audio answer to the second audio question into fourth text data and saving the fourth text data such that the fourth text data is associated with the second audio question. A form document may be populated by the first communication terminal based upon the saved first, second, third and fourth text data. In one embodiment, the first communication terminal may receive a third audio question from the second communication terminal or first communication device and determine that it is the same as the second audio question by asking the same exact question or a question that is substantially similar in content to the second audio question. In response to such a determination, the first communication terminal may suggest a third answer to the third question to the user of the first communication terminal that is in at least one of audio format and text format. For example, a suggested third answer may be emitted via a speaker of the terminal in audio format and also be displayed as text in a display of the terminal. The third answer in audio format may comprise the second audio answer and the third answer in text format may comprise the fourth text data. The first communication terminal may send the third answer upon receipt of authorization to do so from the user of the first communication terminal. The third answer may be sent in at least one of text and audio format.

In yet other embodiments of the system, the second communication terminal activates the speech to text translation mechanism, which may include an application stored in the memory of the second communication terminal that is executed by the second communication terminal. The second communication terminal may then perform the translation of the audio data into text data and saving of the translated text data. The communication session may be established by the first communication terminal forming the session with the second communication terminal. The second communication terminal may perform the translation of the audio data into the text data and save the translated text data by the second communication terminal translating a first audio question into first text data and saving the translated first text data of the first question, the second communication terminal translating a first audio answer to the first audio question into second text data and saving the second text data so that the second text data is associated with the first audio question, the second communication terminal translating a second audio question into third text data and saving the third text data of the second audio question, and the second communication terminal translating a second audio answer to the second audio question into fourth text data and saving the fourth text data such that the fourth text data is associated with the second audio question. A form document may be populated by the second communication terminal based upon the saved first, second, third and fourth text data. Some embodiments of the system may also include a second communication device and the form document may be sent to at least one of the first and second communication devices by the second communication terminal.

In one embodiment of the system, the first communication terminal may be registered with a service hosted by the first communication device such that a call by the second communication terminal to the first communication terminal to establish a communication session results in the call being forwarded to the first communication device. The first communication device may establish the communication session and connect the first communication terminal to the established communication session. The first communication device may activate the speech to text translation mechanism. The speech to text translation mechanism may include an application stored in the first communication device that is executed by the first communication device. The first communication device can translate the audio data into text data and saving the translated text data. The first communication device translating of the audio data into text data and saving the translated text data may include the steps of the first communication device translating a first audio question into first text data and saving the first text data of the first audio question, the first communication device translating a first audio answer to the first audio question into second text data and saving the second text data such that the second text data is associated with the first audio question, the first communication device translating a second audio question into third text data and saving the third text data of the second audio question, and the first communication device translating a second audio answer to the second audio question into fourth text data and saving the fourth text data such that the fourth text data is associated with the second audio question.

A method of processing audio data is also provided. The method includes the steps of establishing a communication session between a first communication terminal and a second communication terminal in which audio data is transmitted between the first and second communication terminals and translating the audio data into text data after receiving input to activate a speech to text translation mechanism.

In some embodiments of the method, the translating of the audio data into text data after receiving input to activate a speech to text translation mechanism may include translating a first audio question into first text data and saving the first text data and translating an audio answer to the audio question into second text data and saving the second text data such that the first text data is associated with the second text data. The translating the audio data into text data after receiving input to activate a speech to text translation mechanism may also comprise receiving input indicating the first audio answer is to be given in response to the first audio question and receiving input indicating the first audio answer is completed.

In one embodiment of the method, the speech to text translation mechanism is an application stored in the first communication terminal or the second communication terminal that is run on the first communication terminal or the second communication terminal after receipt of input to activate the speech to text translation mechanism. In other embodiments of the method, the speech to text translation mechanism may be an application stored on the memory of a first communication device that is run on that device after receipt of input to activate the speech to text translation mechanism.

The communication session may be established by a first communication device in some embodiments of the method. The first communication device may perform the translating of the audio data into text data after receiving input to activate the speech to text translation mechanism. The first communication device may also receive a second audio question and determine that the second audio question is the same as the first audio question. In response to the first communication device determining that the second audio question is the same as the first audio question, the first communication device may suggest a second answer to the second audio question to the first communication terminal by suggesting the first audio answer. The first audio question may be the same as the second audio question if it is exactly the same question or asks for the exact same information previously provided in the first answer. In response to receiving input authorizing the first communication device to transmit the suggested second answer from the first communication terminal, the first communication device transmits the second answer to the second audio question to the second communication terminal in at least one of audio format and text format.

Some embodiments of the method may also include steps associated with creating a document based upon the first and second text data. The created document may be a populated form or may be a word processing document transcribing the content of a call, for example. The created document may be sent to another device.

In one embodiment of the method, the first communication terminal receives a second audio question and determines that the second audio question is the same as the first audio question. In response to the first communication terminal determining that the second audio question is the same as the first audio question, the first communication terminal suggests a second answer to the second audio question to a user of the first communication terminal by suggesting the first audio answer in at least one of audio format and text format. In response to receiving input authorizing the first communication terminal to transmit the suggested second answer, the first communication terminal transmits the second answer to the second audio question to the second communication terminal in at least one of audio format and text format.

A non-transitory computer readable medium having an application stored thereon that is executable by a computer device is also provided. The computer device may be a communication terminal or a communication device, for example. The application can define a method of audio data processing that includes the steps of translating audio data transmitted between a first communication terminal and a second communication terminal during an established communication session into text data after receiving input to activate a speech to text translation mechanism. The translating the audio data into text data after receiving input to activate the speech to text translation mechanism may include converting a first audio question into first text data and saving the first text data, and converting a first audio answer to the first audio question into second text data and saving the second text data such that the first text data is associated with the second text data. It should be appreciated that the computer device that executes the application may be the first communication terminal, the second communication terminal or a first communication device in some embodiments of the computer readable medium. In one embodiment, the method defined by the application can also include generating a form document based upon the saved first text data and the saved second text data.

It should be understood that a communication terminal is also provided. The communication terminal can include a processor unit that is coupled to an embodiment of the computer readable medium such that the application is executable by the processor unit such that the communication terminal performs the method defined by the application. A communication device is also provide that can include a processor unit that is coupled to an embodiment of the computer readable medium such that the application is executable by the processor unit of the communication device such that the communication device performs the method defined by the application.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred devices, systems, and apparatuses for providing communications between multiple communication devices are shown in the accompanying drawings and certain present preferred methods of practicing the same are also illustrated therein. It should be understood that like reference numbers used in the drawings may identify like components.

DETAILED DESCRIPTION OF PRESENT PREFERRED EMBODIMENTS

Figure 1:
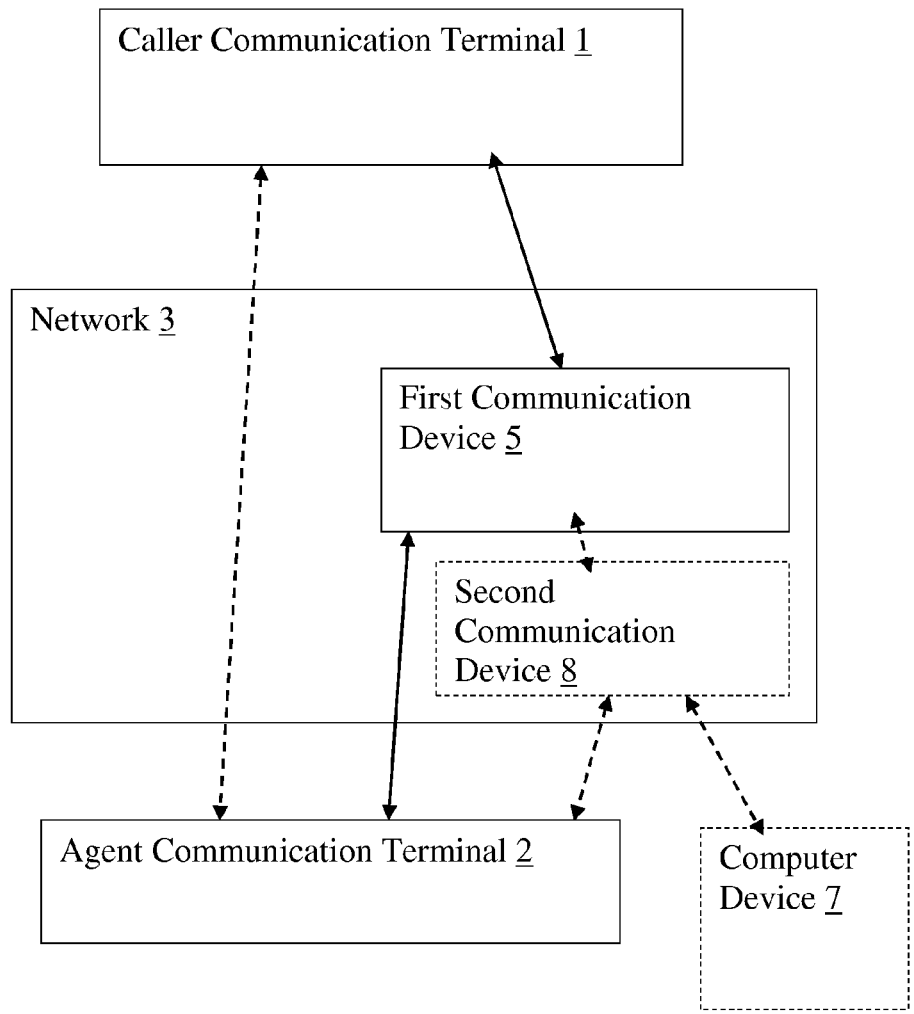
FIG. 1 is a block diagram of an exemplary embodiment of a communication system.

Referring to FIGS. 1-4, a caller communication terminal 1 may communicate with a first communication device 5 that is part of a network such as an enterprise network, local area network, wide area network, or other network. The first communication device 5 may be a switch, a softswitch, a private branch exchange, or other communication device that may route calls to a designated agent that may be assigned to an agent communication terminal 2. The network may include other nodes as well. For instance, the network 3 can include access points (not shown), gateways (not shown), border control elements (not shown), or other network elements as well.

The network may be configured to provide wireless communications and include one or more access points that provide wireless access to the network 3. In one embodiment, such elements of the network may facilitate Wi-Fi compliant communications. It should be appreciated that "Wi-Fi" is a term that is a trademark of the Wi-Fi Alliance and is a brand name associated with wireless local area networks that operate as designed by one of the Institute of Electrical and Electronics Engineers' ("IEEE") 802.11 standards.

The user of the caller communication terminal 1 may attempt to initiate a call to obtain some type of service from an entity providing a service by providing input to the caller communication terminal 1 that provides an address such as a phone number for initiating the call. The caller communication terminal 1 may then utilize the input for signaling an initiate of the call. The first communication device 5 may receive the signaling for establishing such a call and form a connection with the caller communication terminal 1.

The first communication device 5 may form a connection with the caller communication terminal 1 to transmit questions to the caller communication terminal 1 to obtain additional information from the user of the caller terminal 1 for use in routing the call to an appropriate agent or for use in authorizing the user of the caller communication terminal 1 to verify the user is the caller. Such questions may include questions related to personal information of the user of the caller communication terminal 1. Such personal information may include a social security number, a birth date, an account number to which the user is assigned, a phone number or other address at which the user may be reached via a communication terminal, the name of the user, or other personal information of the user of the caller communication terminal 1.

In response to such questions, the user of the caller communication terminal 1 may provide input by pressing a button such as an icon shown an the display of the communication terminal, or other button of the communication terminal or may utilize some other input device for providing input to activate a speech to text translation application that runs on the communication terminal so that audio spoken by the user of the caller communication terminal 1 that is received by a microphone of the communication terminal is translated into text format and stored for subsequent use or transmission. The stored text data converted from the audio data may also be associated with a question received from the first communication device 5.

In an alternative embodiment, the first communication device 5 may activate a speech to text application for translating, or converting, audio received from the caller communication terminal in response to an audio question sent to the caller communication terminal. The first communication device may store the saved text data that is converted from the received audio via the activated speech to text application and associate that saved text data with the question sent to the caller communication terminal 1. The stored text data may be subsequently used to populate one or more forms or may be used for other purposes. In one embodiment, the text data may be communicated to a second communication device 8 and saved in the memory of the second communication device 8. For instance, such data may be saved in a database stored and maintained in the second communication device 8. The second communication device 8 may be subsequently queried by a computer device 7 in a separate communication session between the computer device 7 and second communication device 8 for providing information to other devices by searching the databases in response to received queries.

In yet another embodiment, the first communication device may be a server or other computer device that is configured to provide a personal call agent service. The caller communication terminal 1 may first establish a communication connection with the first communication device 5 that functions as a personal call agent. The first communication device 5 may then prompt the caller communication terminal 1 for an address that identifies a destination for a call or other communication session. The first communication device may then establish such a session such as a call, with a device associated with the destination address, such as a second communication device 8 or an agent communication terminal 2. The first communication device 5 may then stay included in such a communication session and receive the data transmitted between the caller communication terminal 1 and the agent communication terminal 2 or second communication device 8. The first communication device 5 may apply speech to text translations of all audio received during the session and build a form or other word processing document or a spreadsheet document stored in memory of the first communication device that is a text based document. The text of the form may associate answers provided in audio form by a user of the caller communication terminal 1 with questions sent in audio form from the second communication device 8 or the agent communication terminal 2. In the event a repeat question is transmitted to the caller communication terminal 1 in the communication session by the second communication device 8 or agent communication terminal 2, the first communication device 5 may send the answer for the caller communication terminal or may transmit a suggested answer to the caller communication terminal 1 that the user of the caller communication terminal 1 may accept for forwarding to the agent communication terminal 2 or second communication device 8 via input provided for accepting such an answer. If the answer is not acceptable, input may also be provided to prevent the forwarding of the answer to the second communication device 8 or agent communication terminal 2. The input may be provided by a user of the caller communication terminal 1 hitting an icon representing a button on a touch screen display or hitting a dedicated button or moving or otherwise actuating some other input device of the caller communication terminal. The answer sent by the first communication device 5, if approved by the user of the caller communication terminal 1, may be sent in audio format, text format, or in both formats to the agent communication terminal 2 or second communication device 8. If the audio of the answer is sent, the supplied audio may be sent in a standard audio format that is devoid of a regional accent of a user of the caller communication terminal to help better facilitate the communication of the answer.

The communication terminal of the caller communication terminal 1 and agent communication terminal 2 may each be any of a number of different types of terminals such as a cellular phone, a personal digital assistant, a desktop personal computer, a voice over intent telephone device, a telephony device, a laptop computer, a tablet computer device, an internet appliance, or other communication endpoint. It should be understood that the communication terminal 1 may be a different type of terminal device than then agent communication terminal 2. For instance, the caller communication terminal 1 may be a cellular phone in one embodiment while the agent communication terminal is a desktop computer that is coupled to a headset and telephone and configured to provide voice over internet communications.

Figure 2:
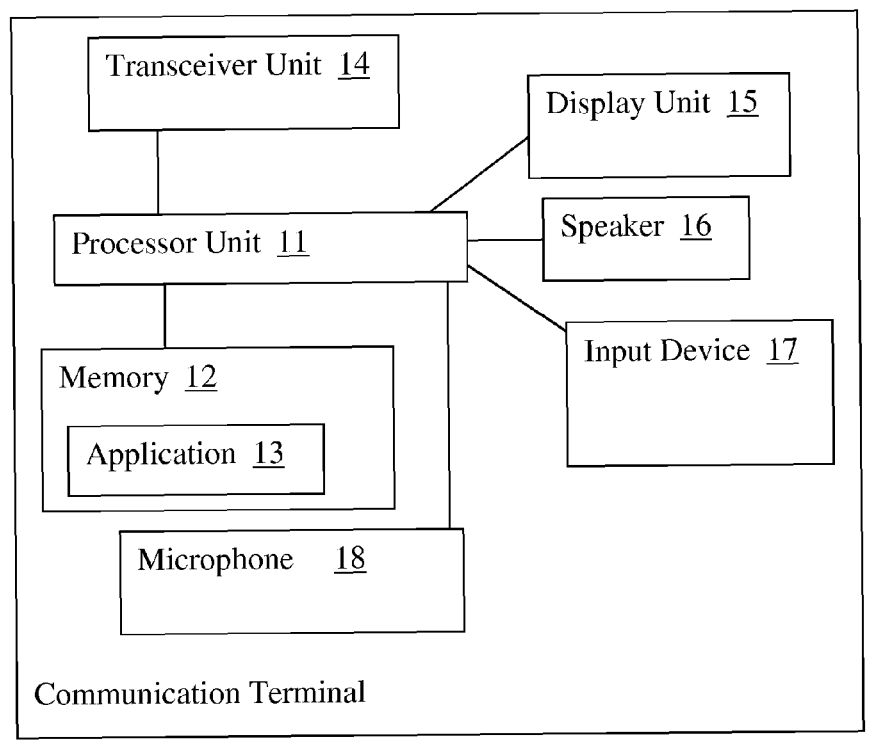
FIG. 2 is a block diagram of an exemplary embodiment of a communication terminal that may be used in embodiments of the communication system. It should be understood that the caller communication terminal 1 and agent communication terminal 2 illustrated in FIG. 1 may each use an embodiment of the communication terminal illustrated in FIG. 2.

An example of a communication terminal that may function as the caller communication terminal 1 or agent communication terminal 2 is shown in FIG. 2. The communication terminal may include a processor unit 11 that is communicatively connected to non-transitory memory 12, a transceiver unit 14, a display unit 15, a speaker 16, an input device 17, and a microphone 18. The input device may be one or more buttons, a mouse, a keyboard, or a duplicate microphone, a camera sensor, or other input device. The processor unit 11 may be a central processing unit such as a microprocessor or other processor unit. The memory 12 may be non-transitory memory such as a hard drive or a flash drive. An application 13 such as a speech to text application may be stored on the memory 12 and define a method that is executed by the terminal when the processor unit 11 executes the application 13. The transceiver unit 14 may include a receiver and a transmitter and be configured to send data and receive data from other network elements or other devices via one or more transmission protocols. The display unit 15 may be a liquid crystal display or other display. In some embodiments, the display unit 15 will be a touch screen display that permits a user to provide input by touching different areas of the display. The speaker 16 may emit audio and the microphone 18 may record audio received from a user speaking toward the microphone or within the receptive range of the microphone 18.

Figure 3A:
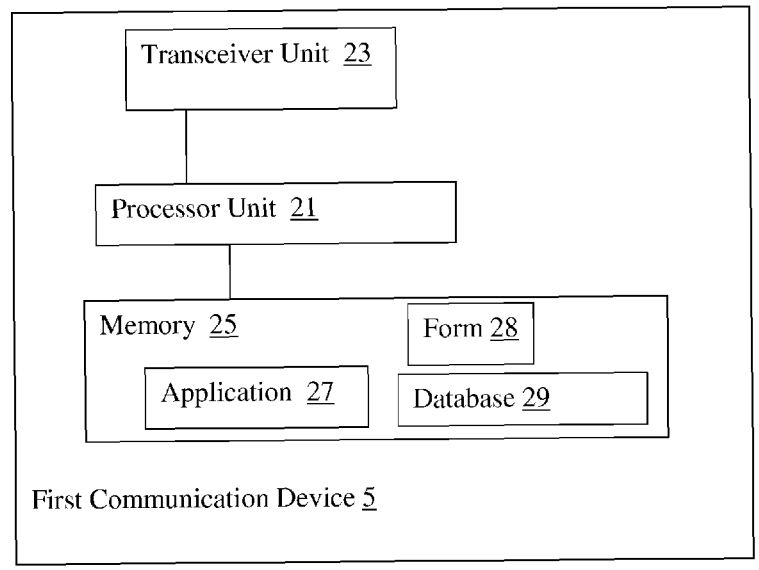
FIG. 3A is a block diagram of an exemplary embodiment of a communication device that may be utilized in embodiments of the communication system.

An example of the first communication device 5 is shown in FIG. 3A. The first communication device 5 may be a network node such as a computer, a work station, a server, a switch, a softswitch, a private branch exchange, or other type of computer device. The first communication device 5 may include a processor unit 21 that is communicatively connected to a transceiver unit 23 and memory 25. The transceiver unit may be configured to exchange data or messages with one or more communication terminals and other network nodes and may also be configured for routing of calls or communication sessions. The memory 25 may be non-transitory memory such as a hard drive, flash drive, or other memory device. An application 27 may be stored in the memory 25. A text based form 28 or a database 29 may also be stored in the memory 25.

Figure 3B:
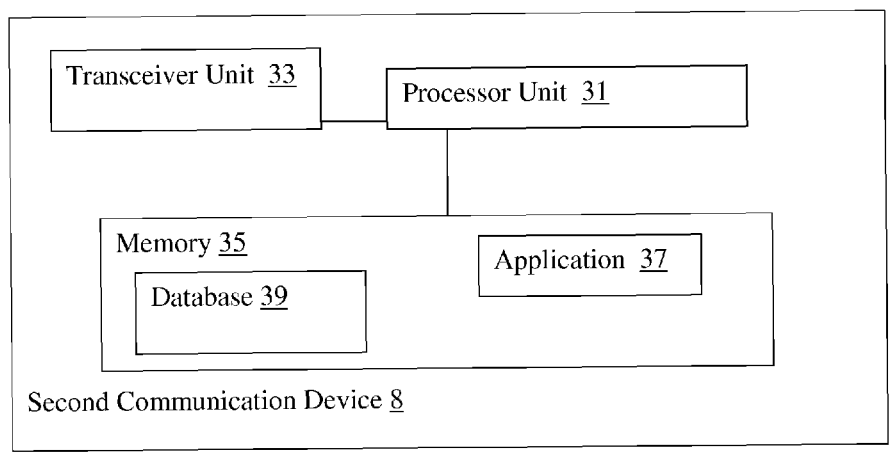
FIG. 3B is a block diagram of an exemplary embodiment of a server that may be utilized in embodiments of the communication system.

An example of the second communication device 8 is shown in FIG. 3B. The second communication device 8 may be a network node such as a computer, a work station, a server, a switch, a softswitch, a private branch exchange, or other type of computer device. The second communication device 8 may include a processor unit 31 that is communicatively connected to a transceiver unit 33 and memory 35. The transceiver unit 33 may be configured to exchange data or messages with one or more communication terminals and other network nodes and may also be configured for routing of calls or communication sessions. The memory 35 may be non-transitory memory such as a hard drive, flash drive, or other memory device. An application 37 may be stored in the memory 35. A database 39 may also be stored in the memory 25.

Figure 4:
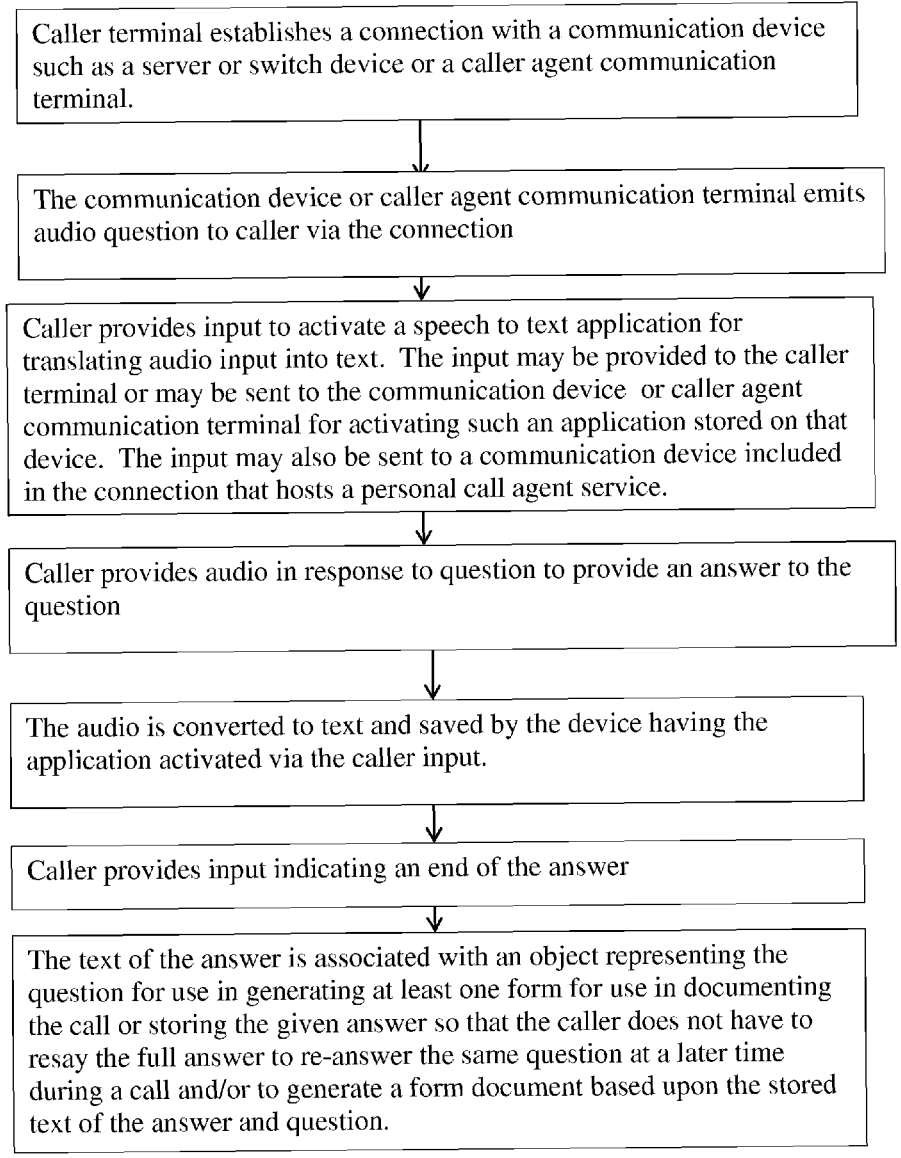
FIG. 4 is a flow chart of an exemplary embodiment of a method of processing audio data.
Figure 5:
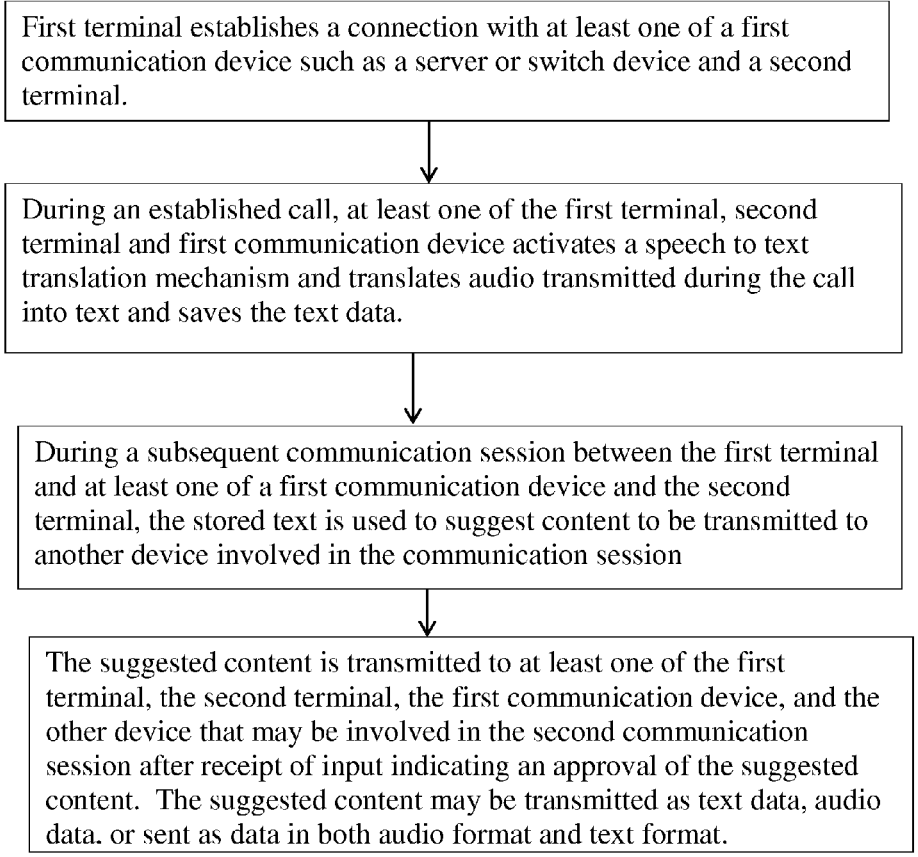
FIG. 5 is a flow chart of another exemplary embodiment of a method of processing audio data.

The exemplary embodiment of the communication system of FIG. 1 may be utilized in different embodiments of a method for audio form processing, as may be appreciated by FIGS. 4-5. The embodiments of the method may also utilize different embodiments of the network 3, the caller communication terminal 1, the agent communication terminal 2, first and second communication devices 5 and 8, and a computer device 7.

In one embodiment of a method for audio form processing, a caller may use the caller communication terminal 1 to initiate a call by calling a phone number. Such a call may be actuated by the caller entering an address as input into the caller communication terminal 1 and pressing an input device to initiate the call. In one embodiment, the call may be to an agent communication terminal 2. In another embodiment, the call may be to a first communication device 5 that may provide a personal call agent service.

If the call is established with an agent via the agent communication terminal 2, the caller and agent may be able to talk to each other via the formed communication session. The session may be an audio only communication or may include a video and audio communication session. The agent may inform the caller that he or she has a number of questions that need to be answered. The agent or the caller may ask whether an audio form processing mechanism may be used so that the answers are automatically translatable into text for purposes of storing the answers and generating one or more forms or other documents with such information. Alternatively, the caller communication terminal 1 and agent communication terminal 2 may inquire regarding such functionality being available during the signaling that is exchanged to establish the communication session.

If the caller terminal or the agent communication terminal has a speech to text application or personal call agent application available to assist with the saving of answers, saving of questions, the saving of answers and questions, or the saving of all audio exchanged during a call in a text format, the caller or agent may actuate such an application by providing input to the communication terminal associated with that caller or agent. Then, the agent may ask a first question in audio and then press a key or provide other input to indicate the question is finished. Thereafter, the caller may provide an answer in audio and press a key or button or otherwise provide input to indicate the answer is finished. The question may be translated into text and stored and the subsequent answer may be translated into text, stored, and then associated with the stored question. Such translation and storage may occur while the agent or caller is speaking so that such actions occur in real time or relatively close to real-time.

A number of questions may be asked in series. Such questions may relate to a callers' name, birth date, social security number, account number, address, phone number, email address, or other personal information or other information. Each answer may be given in response to the question and the audio content of each answer may be translated into text, saved, and associated with the question to which the answer was given. Each question may also be translated into text and saved.

The saved text for the answers and questions may then be sent from the caller communication terminal 1 or agent communication terminal 2 to another device for storage and subsequent use. For instance, the saved data may be sent to a first communication device 5 or a second communication device 8 or a computer device 7. That data may then be stored in a database. The data could also be used to generate a form and then the generated form may be saved in memory of that device. The generated form could then be used in future processing. The generated form could also be forwarded to other agent communication terminals when the caller again calls to obtain service from an entity so that the caller's information may be displayed to an agent via a display of the agent communication terminal.

Alternatively, the call from the caller may be initially answered by the first communication device 5, which may function as a switch device or server that may initially interact with the caller for purposes of routing the call to an appropriate agent associated with an agent communication terminal. The first communication device 5 may ask a series of questions that are predefined by an application 27 of the first communication device 5. The caller of the caller communication terminal may then speak answers to these questions. The first communication device 5 may record the audio of the answers and have an activated speech to text function of the application 27 translate such audio answers into text. The text of each answer may be assigned to an object representing the question to which the answer was given and a text based form 28 may be generated from the answers and questions and saved. The text based form may be saved as a word processing document or spreadsheet document, for example. The generated form may then be sent to an agent communication terminal 2 to which the first communication device 5 may route the call after assessing the answers provided by the caller to determine that the agent of the agent communication terminal 2 is the appropriate agent to which the call should be routed.

In yet another embodiment, the caller may call a first communication device 5 prior to contacting an agent of a service provider in a subsequent communication session. The caller may form a communication session with the first communication device 5 to obtain personal call agent services. For such an embodiment, the first communication device 5 may be a server or other computer device that hosts such a service. After establishing the communication session with the first communication device 5, the caller may enter an address associated with a service provider such that the first communication device 5 establishes a connection with the second communication device 8, which may function as an exchange device, switch device, or other communication device used to route calls to an appropriate agent. The first communication device 5 may have actuated a speech to text application for recording audio answers and questions that take place during the session with the second communication device 8, translating or converting such audio content into text, and associating the answers to the questions to which the answers were given. The first communication device 5 may also mute the second communication device 8 during the communication session after receiving a repeat question to suggest an answer to the repeated question. The caller may then enter input via the caller communication terminal 1 to accept the suggested answer or refuse it. If the answer is accepted by the caller, the first communication device 5 may unmute the second communication device 8 and then transmit audio that provides the suggested answer. A transmission of a message containing the text of the audio of the answer may also be transmitted from the first communication device 5 to the second communication device 8.

The suggested answer may be in a standard voice that does not have any accent that the caller may have to improve the understandability of the given repeat answer communicated by the first communication device 5. The first communication device 5 may also generate a word processing document or other document based upon the stored answers and questions to which those answers are associated and transmit that form to the second communication device 8 for that device to store or subsequently forward or otherwise use as the caller's call is further routed to an agent. In the event the suggested answer is rejected by the caller, the first communication device 5 may unmute the connection with the second communication device 7 and record and translate the answer provided by the caller in audio form.

In yet another embodiment, the first communication device 5 that functions as a personal call agent may establish a communication session with an agent communication terminal 2. The first communication device 5 may have actuated a speech to text application for recording audio answers and questions, translating such audio content into text, and associating the given answers to the questions to which the answers were given. The first communication device 5 may then mute the agent communication terminal 2 to suggest an answer to any question that is repeated. The caller may then enter input via the caller communication terminal 1 to accept the suggested answer or refuse it. If the answer is accepted by the caller, the first communication device 5 may unmute the agent communication terminal 2 and then transmit audio that provides the suggested answer. The suggested answer that is transmitted as audio data to the agent communication terminal 2 may be in a standard voice that does not have any accent that the caller may have to improve the understandability of the given repeat answer communicated by the first communication device 5. The first communication device 5 may also transmit text data to the agent communication terminal that provides the text of the answer to the question. In the event a suggested answer is rejected by the caller, the first communication device 5 may unmute the connection with the agent communication terminal 2 and record and translate the answer provided by the caller in audio form. Upon receipt of input indicating the speech to text translation services is no longer needed, the first communication device 5 may also generate a word processing document or other document based upon the stored answers and questions to which those answers are associated and transmit that form to the agent communication terminal for that device to store or subsequently forward or otherwise use.

It should be understood that the document generated by the first communication device 5 when that device functions as a personal call agent may also be sent to the caller communication terminal 1 for storage in the memory of the caller communication terminal. Such form generation may help document or transcribe a call when such a record of a call is desired by the caller or agent.

In yet another embodiment, the application 13 of the caller communication terminal 1 may be actuated so that the personal call agent service is run on the caller communication terminal 1. The questions and answers stored in prior calls may be stored in the memory 12 of the caller communication terminal 1 and may be utilized so that when a question similar or the same to a previously asked question is received in a new communication session, the communication terminal is able to offer a suggested answer to the caller that the caller may accept or deny. The saved answers and questions from past calls may be stored in a database of the memory of the communication terminal so that the answers and questions from prior calls are associated with the communication address used for that calls. The suggested answers may then only be offered if the same question was previously asked in a prior communication had with the same communication address. The saved data may also be stored in a text document, such as a database or form in the memory 12 of the caller terminal 1 and the saved data may be searched via text searching for identifying pertinent data that is responsive to an entered text searching query. For such embodiments, the personal call agent may be a feature or function provided by the caller communication terminal 1 and not a separate device of a communication system that offers a service or a component of an enterprise network to which the caller communication terminal 1 connects for obtaining a service or communicating with an agent. An application stored on the caller communication terminal 1 that is executed or run by a processor of the caller communication terminal 1 may define the feature or function of the caller communication terminal 1.

In yet another embodiment where the application 13 of the communication terminal can provide the personal call agent services, the user of the communication terminal may receive a call from an agent communication terminal 2 or other communication terminal such as a terminal of a friend of business associate. The user of the communication terminal receiving the call may activate the application 13 when the call is answered by his or her communication terminal or may activate the application 13 at a later time after the call has been ongoing and it is clear certain information needs to be communicated via the call that is similar to information the user previously provided in another call. The application 13 may then be executed so that the audio exchanged between terminals during the call is translated into text and stored. A form or other document may be created that is based on the exchanged audio as discussed above. For example, the audio may be saved as a word processing document transcribing the call or may be used to generate a form for conveying certain information exchanged during the call. Additionally, the communication terminal of the user receiving the call may suggest answers to certain questions received from the caller and may transmit such answers in a standard audio voice format upon receipt of input from the user of the communication terminal authorizing the transmission of the suggested answer similarly to other embodiments discussed above.

In yet another embodiment, the agent communication terminal 2 may be configured to communicate with the second communication device 8, which may be a server that hosts a personal call agent service for the agent associated with the agent communication terminal 2. Any call sent to the agent communication terminal 2 may be automatically forwarded to the second communication device 8 based upon a setting associated with this service so that every call directed to the agent communication terminal 2 is directed or forwarded to the second communication device 8. Upon receipt of the call, the second communication device 8 may then join the agent communication terminal 2 to the communication session and be configured to save all audio data transmitted between the agent communication terminal and the device that initiated the call with the agent communication terminal 2. The second communication device 8 may then generate a form or other document based upon the saved text of the audio data exchanged during the communication session that can be sent to the agent communication terminal or other device. The text data translated from the audio of the communication session could also be sent to another device for storage or other use by the second communication device 8. It should be understood that the caller communication terminal 1 could also be configured so that calls directed to that terminal are directed or forwarded to a communication device to which a user of the caller terminal is registered for providing such a personal call agent service as well.

It should be understood that a number of other alternative embodiments of the communication system, terminals, communication devices and applications stored in non-transitory memory of such devices may be made. For example, the first communication device 5 may be a server accessible via an internet connection that is not part of an enterprise network that functions as a personal call agent that provides the service when the caller contacts an agent communication terminal via a network connection (e.g. internet connection, enterprise network intranet connection, etc.). As another example, some embodiments of the system may only be configured for form generation based on received audio to occur when a caller is communicating with an agent via the agent communication terminal. The generated form or other type of word processing document or database document created from audio exchanged from such a call may then be transmitted to a server or other communication device for storage in a master database or other storage mechanism. A computer device 7 may then communicate with the master database to query the database for information that may relate to information obtained from such a call at a later time.

In yet another embodiment of the system, it should be understood that the caller communication terminal 1 and the agent communication terminal 2 may be telephones or other telephony enabled devices of the same enterprise network. For instance, the caller communication terminal 1 may be a device associated with a manager and the agent communication terminal 2 may be a device associated with another manager or an employee that works at the manager's direction or an employee that provides instructions to the manager. In yet other embodiments, the agent communication terminal 2 may be a terminal associated with a friend or associate of the user of the caller communication terminal 1.

It should also be understood that a caller communication terminal 1 and agent communication terminal 2 may be first or second communication terminals in different embodiments of a communication system. A first communication terminal may have an application that provides a personal call agent service thereon or subscribe to a service hosted by another device such as a server. The personal call agent service provided by the terminal or service to which the terminal is registered may provide such a service during any call received or initiated by the first communication terminal. Likewise, the second communication terminal may have an application that provides a personal call agent service thereon or subscribe to a service hosted by another device and may provide such a service during any call received or initiated by the second communication terminal.

While certain present preferred embodiments of the communication terminal, communication device, communication system, and methods of making and using the same have been shown and described above, it is to be distinctly understood that the invention is not limited thereto but may be otherwise variously embodied and practiced within the scope of the following claims.

What is claimed is:

1. A communication system comprising:
   a first communication terminal; and
   at least one of a first communication device and a second communication terminal communicatively connectable to the first communication terminal for establishing a communication session in which audio data is transmitted between the first communication terminal and the at least one of the first communication device and the second communication terminal; and
   at least one of the first communication terminal, the first communication device, and the second communication terminal being configured to activate a speech to text translation mechanism, the speech to text translation mechanism configured to translate the audio data into text data such that the speech to text translation mechanism is configured to translate a first audio answer given during the communication session to a first audio question into first text data such that the first text data is savable so that the first text data is associatable with the first audio question; and
   at least one of the first communication terminal, the first communication device, and the second communication terminal being configured such that, in response to a determination that a second audio question asked during the communication session is the same question as the first audio question, a second answer to the second question is suggested in at least one of audio format and text format, the second answer in audio format comprising the first audio answer and the second answer in text format comprising text of the first text data.

2. The communication system of claim 1 wherein the audio data comprises audio questions transmitted by one of the first communication device and the second communication terminal and the audio data also comprises audio answers transmitted by the other of the first communication terminal and the second communication terminal; and wherein the speech to text translation mechanism is configured to translate the audio data into text data such that the first audio question is translated into text data to save that text data so that the first text data is associated with the saved text data of the translated first audio question.

3. The communication system of claim 1 wherein at least one of the first communication terminal, the first communication device, and the second communication terminal is configured such that the first text data of the first audio answer is associated with an object representing the first audio question.

4. The communication system of claim 3 wherein the saved first text data is entered into a form document by the second communication terminal or the first communication device and the form document is saved.

5. The communication system of claim 3 wherein the first communication device is a switch device or a server computer device, the first communication terminal is one of a caller communication terminal and an agent communication terminal and the second communication terminal is the other of the caller communication terminal and the agent communication terminal.

6. The communication system of claim 1 wherein the first communication device provides a personal call agent service and wherein the first communication device activates the speech to text translation mechanism, the speech to text translation mechanism comprising an application stored in the first communication device that is executable by the first communication device such that the first communication device is configured to translate the audio data into text data by running the application and is also configured to save the translated text data;

wherein the communication session is establishable:
the first communication terminal forming a connection with the first communication device, and
the first communication device receiving input identifying an address and initiating the establishing of the communication session based upon the identified address, the communication session being established with the second communication terminal such that the second communication terminal, first communication device, and first communication terminal are involved in the communication session such that the first communication device receives audio data transmitted between the first communication terminal and the second communication terminal during the communication session; and wherein the first communication device is configured to translate the audio data into text data and is also configured to save the translated text data such that:
the first communication device is configured to translate the first audio question into second text data and save that second text data of the first audio question,
the first communication device is configured to translate the first audio answer to the first audio question into the first text data and save the first text data such that the first text data is associated with the first audio question,
the first communication device is configured to translate the second audio question into third text data and save the third text data of the second audio question, and
the first communication device is configured to translate the second audio answer to the second audio question into fourth text data and save the fourth text data such that the fourth text data is associated with the second audio question.

7. The communication system of claim 1 wherein the first communication terminal provides a personal call agent service and wherein the first communication terminal is configured to activate the speech to text translation mechanism, the speech to text translation mechanism comprising an application stored in the first communication terminal that is executable by the first communication terminal, the first communication terminal being configured to translate the audio data into text data by running the application and is also configured to save the translated text data;

wherein the communication session is established by the first communication terminal forming a connection with the first communication device or the second communication terminal, and
wherein the first communication terminal is configured to translate the first audio answer question into the first text data and save the first text data and is configured to translate the second audio answer into second text data and save the second text data.

8. The communication system of claim 1 wherein the second communication terminal is configured to activate the speech to text translation mechanism, the speech to text translation mechanism being an application stored in the second communication terminal that is executable by the second communication terminal, the second communication terminal being configured to translate the audio data into text data by running the application and is also configured to save the translated text data;

wherein the communication session is established by the first communication terminal forming a connection with the second communication terminal, and
wherein the second communication terminal is configured to translate the first audio answer into the first text data and save the first text data and is configured to translate the second audio answer into the second text data and save the second text data.

9. The communication system of claim 8 wherein a form document is populated by the second communication terminal based upon the saved first text data and second text data.

10. The communication system of claim 9 further comprising a second communication device, and wherein the second communication terminal sends the form document to at least one of the second communication device and the first communication device.

11. The communication system of claim 6 wherein a form document is populated by the first communication device based upon the saved first text data, second text data, third text data and fourth text data.

12. The communication system of claim 7 wherein a form document is created by the first communication terminal based upon the saved first text data, and second text data.

13. The communication system of claim 1 wherein the first communication terminal is registered with a service hosted by the first communication device such that a call by the second communication terminal to the first communication terminal to establish a communication session results in the call being forwarded to the first communication device, the first communication device establishing the communication session and connecting the first communication terminal to the established communication session; and wherein the first communication device is configured to activate the speech to text translation mechanism, the speech to text translation mechanism comprising an application stored in the first communication device that is executable by the first communication device such that the first communication device is configured to translate the audio data into text data such that the first communication device is configured to translate the first audio answer into the first text data and the second audio answer into the second text data and save the translated first and second text data.

14. A method of processing audio data comprising:
establishing a communication session between a first communication terminal and a second communication terminal in which audio data is transmitted between the first and second communication terminals;
translating the audio data into text data after receiving input to activate a speech to text translation mechanism, the translating the audio data into text data comprising:
translating a first audio answer to a first audio question into first text data; and
determining, by one of the first communication terminal, the second communication terminal, and a first communication device, that a second audio question asked during the communication session is the same question as the first audio question;
in response to determining that the second audio question is the same as the first audio question, suggesting a second answer in at least one of audio format and text format via one of the first communication terminal, the second communication terminal, and the first communication device, the second answer in audio format comprising the first audio answer and the second answer in text format comprising text of the first text data.

15. The method of claim 14 wherein the translating the audio data into text data after receiving input to activate a speech to text translation mechanism comprises:
translating the first audio question into second text data;
the method also comprising saving the first and second text data such that the first text data is associated with the first audio question.

16. The method of claim 15 also comprising:
receiving input indicating the first audio answer is to be given in response to the first audio question; and
receiving input indicating the first audio answer is completed.

17. The method of claim 16 wherein the speech to text translation mechanism is an application stored in the first communication terminal or the second communication terminal that is run on the first communication terminal or the second communication terminal after receipt of the input to activate the speech to text translation mechanism.

18. The method of claim 15 wherein the communication session is established by the first communication device and wherein the first communication device performs the translating of the audio data into text data after receiving input to activate the speech to text translation mechanism.

19. The method of claim 15 further comprising creating a document based upon the first text data.

20. A non-transitory computer readable medium having an application stored thereon that is executable by a computer device, the application defining a method of audio data processing comprising:
translating audio data transmitted between a first communication terminal and a second communication terminal during an established communication session into text data after receiving input to activate a speech to text translation mechanism,
the translating the audio data into text data after receiving input to activate the speech to text translation mechanism comprising:
converting a first audio question into first text data and saving the first text data, and
converting a first audio answer to the first audio question into second text data and saving the second text data such that the first text data is associated with the second text data; and
determining that a second audio question asked during the communication session is the same question as the first audio question;
in response to determining that the second audio question is the same as the first audio question, suggesting a second answer in at least one of audio format and text format, the second answer in audio format comprising the first audio answer and the second answer in text format comprising text of the second text data.

21. The non-transitory computer readable medium of claim 20 wherein the computer device is a communication terminal or a communication device and the method further comprises generating a form document based upon the saved first text data and the saved second text data.

* * * * *